(12) United States Patent
Marutyan

(10) Patent No.: US 7,602,964 B2
(45) Date of Patent: Oct. 13, 2009

(54) METHOD AND APPARATUS FOR DETECTION OF FAILURES IN A WAFER USING TRANSFORMS AND CLUSTER SIGNATURE ANALYSIS

(75) Inventor: Rafik Marutyan, Palo Alto, CA (US)

(73) Assignee: Synopsys, Inc., Mountain View, CA (US)

( * ) Notice: Subject to any disclaimer, the term of this patent is extended or adjusted under 35 U.S.C. 154(b) by 697 days.

(21) Appl. No.: 11/329,587

(22) Filed: Jan. 10, 2006

(65) Prior Publication Data

US 2007/0160281 A1 Jul. 12, 2007

(51) Int. Cl.
*G06K 9/00* (2006.01)
*G06K 9/46* (2006.01)
*G06K 9/48* (2006.01)

(52) U.S. Cl. .................. 382/149; 382/199; 382/203

(58) Field of Classification Search .................. 438/16; 382/144, 199, 203
See application file for complete search history.

(56) References Cited

U.S. PATENT DOCUMENTS

| | | | | |
|---|---|---|---|---|
| 6,072,900 | A * | 6/2000 | Chiu et al. | 382/149 |
| 6,483,938 | B1 * | 11/2002 | Hennessey et al. | 382/149 |
| 2001/0021276 | A1 * | 9/2001 | Zhou | 382/266 |
| 2002/0114518 | A1 * | 8/2002 | Wilt | 382/199 |

* cited by examiner

*Primary Examiner*—Jon Chang
(74) *Attorney, Agent, or Firm*—Bever, Hoffman & Harms, LLP; Jeanette S. Harms

(57) ABSTRACT

Detecting spatial failures in a wafer can be performed quickly and accurately by using transformations and cluster signature analysis. For this technique, a system can receive failure coordinates for the wafer, wherein each failure coordinate indicates a spatial failure. A failure array can be generated based on a resolution of those failure coordinates. A first set of objects, e.g. linear and arc objects, can be detected in the failure array using transformations. A second set of objects, e.g. blob and scratch objects, can be detected in the failure array using cluster signature analysis. This technique advantageously reduces the amount of memory required to perform the analysis and increases the processing speed without increasing the error rate of detection.

34 Claims, 11 Drawing Sheets

800

900

1000

1100

METHOD AND APPARATUS FOR DETECTION OF FAILURES IN A WAFER USING TRANSFORMS AND CLUSTER SIGNATURE ANALYSIS

BACKGROUND OF THE INVENTION

1. Field of the Invention

This invention relates to detecting spatial failures in a wafer of integrated circuits and particularly to quickly and accurately identifying types of spatial failures, such as linear, arc, blob, and scratch objects.

2. Related Art

Many electronic devices include integrated circuits (ICs) to perform functions. Manufacturers of electronic devices are constantly trying to minimize productions costs of electronic devices. One way to reduce the cost of ICs is to quickly and accurately detect IC failures, including but not limited to failures, in the manufacturing process. ICs are manufactured in wafers. A wafer is multiple ICs made on one surface. The ICs are then each individually removed from the wafer. Errors in the manufacturing process may cause scratches or other types of spatial failures in the wafer that can result in failures of the ICs. Spatial failures that result in failures of the ICs must be repaired or the ICs may be deemed unusable. Thus, makers of ICs are constantly striving to find methods of quickly and accurately detecting spatial failures caused during manufacturing.

SUMMARY OF THE INVENTION

In accordance with one aspect of the invention, a method and system can use transforms and cluster signature analysis to quickly and accurately detect spatial failures in a wafer. As used herein, a spatial failure is any Boolean spatial information. Examples of spatial failures include, but are not limited to, all types of defects and parametric failures. In this method and system, only the coordinates of the spatial failures are analyzed (that is, other attributes of the failures are not necessary for the analysis). The transforms and signature analysis advantageously reduce the amount of memory required to perform the analysis and increase the processing speed without increasing the error rate of detection.

In one embodiment, high performance can be achieved through a two-stage detection process. A first stage of the process, with an array of spatial failures as input, can detect specific spatial failure objects based on transforms using a rectangular matrix and groupings of spatial failures using cluster signature analysis. A second stage of the process can perform a second detection based on the spatial failure objects found in the first stage.

In one embodiment, once the coordinates of the spatial failures of a wafer (called a failure array) are received, a system can automatically vary the resolution to optimize the identification of the spatial failure objects while taking into account system resources. Notably, the number of spatial failures in the failure array depends on the resolution.

Using the failure array, the system can methodically detect a specific type of spatial failure object and then remove the spatial failures constituting that spatial failure object from the failure array. For example, the system can detect linear objects (i.e. lines) and then remove the spatial failures forming that linear object from the failure array. The system can use the spatial failures remaining in the failure array to detect another type of spatial failure object, such as arc objects. Any detected arc objects can then be removed from the failure array. At this point, the system can use the spatial failures remaining in the failure array to detect yet another type of spatial failure object, such as blob objects. Any detected blob objects can then be removed from the failure array. In one embodiment, the system can then detect scratch objects, which can include combinations of linear, arc, and blob objects.

A linear object can be detected by generating a two-dimensional histogram from a Hough transform of the failure array. Local maximums are then determined from the histogram. A covering matrix is then generated for each local maximum. The covering matrix is then divided into sub-matrices. The average and maximum of each sub-covering matrix are then determined and are used in comparison with constants to find the linear objects.

An arc object can be detected by generating a histogram from a Hough circle transform of the array. Local maximums are then determined from the histogram. A covering matrix is then generated for each local maximum. The covering matrix of adjacent failures is then determined for each local maximum. Each covering matrix is then divided into sub-matrices. The average and maximum are then determined for each sub-covering matrix. The averages and maximums are then used to determine which local maximums represent arc objects.

A blob object can be detected by using cluster signature analysis. In cluster signature analysis, a first spatial failure is selected from the failure array and designated as a blob object in a blob object list. The first spatial failure is then removed from the failure array. At this point, another spatial failure is selected from the failure array.

If the distance between the first spatial failure and the other spatial failure is less than a predetermined distance, then the other spatial failure is also designated part of the blob object. Other spatial failures in the failure array are similarly analyzed. That is, any spatial failure from the failure array being less a predetermined distance from the first spatial failure is part of the blob object and is removed from the failure array.

After spatial failures in the failure array have been analyzed with respect to that blob object, the number of spatial failures included in the blob object can be compared to a constant. If the number of spatial failures is greater than the constant, then the blob object is saved. Otherwise that blob object is deleted (because it is too small to be characterized as a blob) and the spatial failures included in that blob object can be re-inserted into the failure array. The process is then repeated until each spatial failure either forms part of a blob object or is analyzed as the first spatial failure (that is, an isolated failure will not form part of a blob object, but will be analyzed as a first failure at some point in the process).

Scratch objects, which by definition include combinations of linear, arc, and blob objects, can also be detected using cluster signature analysis. In one embodiment, a list of objects, e.g. linear, arc, and blob objects, is created. A first object is then selected from the object list and designated a scratch object in a scratch object list. If the first object meets the parameters of a scratch object, then the first object is then removed from the object list. Another object is then selected from the object list. If this object also meets the parameters of a scratch object and is within a predetermined distance from the first object, then the selected object can be placed in the scratch object and removed from the object list.

All remaining objects in the object list can be similarly analyzed with respect to the first object. That is, any object from the object list meeting the parameters for a scratch object and within the predetermined distance to the first object is then placed in the scratch object and removed from the object list. The number of objects in the scratch object can then be compared to a constant. If the number of objects in the scratch object is greater than the constant, then the scratch object is saved. Otherwise the scratch object is deleted and the objects included in that scratch object are re-inserted into the object list. The process is then repeated until each object either forms part of a scratch object or is analyzed as the first object (that is, an isolated object will not form part of a scratch object, but will be analyzed as a first object at some point in the process).

DETAILED DESCRIPTION OF THE FIGURES

A system and method for detecting spatial failures in a wafer of integrated circuits (ICs) using transforms and cluster signature analysis are described. This system and method can advantageously reduce the amount of memory required to perform the spatial failure analysis and increase the processing speed, all without increasing the error rate of detection.

Figure 1:
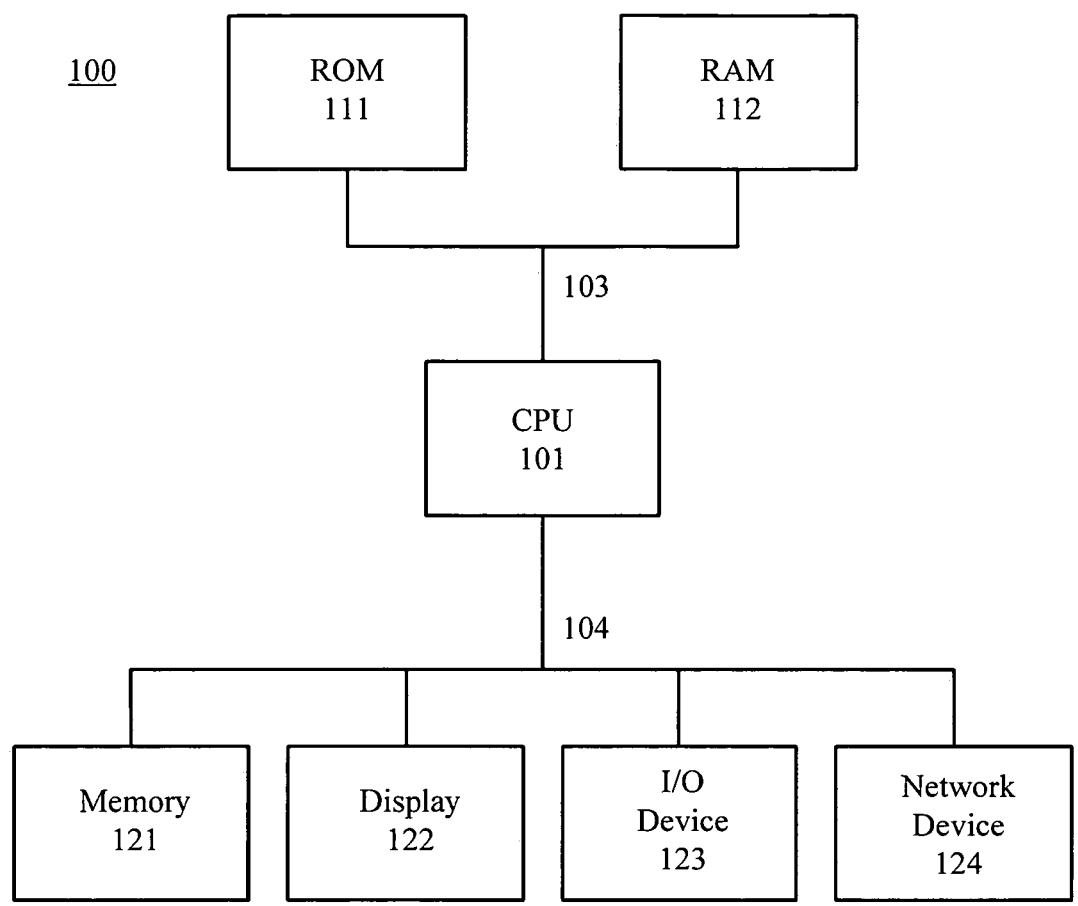
FIG. 1 illustrates a processing system that can execute instructions for performing transforms and cluster signature analysis.

FIG. 1 illustrates an exemplary processing system 100 that can execute instructions for performing transforms and cluster signature analysis. One skilled in the art will recognize that other types and configurations of processing systems may execute these instructions. In this embodiment, processing system 100 includes a central processing unit (CPU) 101. CPU 101 can be a processor, microprocessor, or any combination of processors and/or microprocessors that execute instructions stored in memory to perform an application. CPU 101 is connected to a memory bus 103 and an input/output (I/O) bus 104.

A non-volatile memory, such as read only memory (ROM) 111, can be connected to CPU 101 via a memory bus 103. ROM 111 stores instructions for initialization and other systems command of processing system 100. One skilled in the art will recognize that any memory that cannot be written to by CPU 101 may be used for the functions of ROM 111.

A volatile memory, such as random access memory (RAM) 112, can also be connected to CPU 101 via memory bus 103. RAM 112 stores instructions for all processes being executed and data operated upon by the executed processes. One skilled in the art will recognize that other types of memories, such DRAM and SRAM, may also be used as volatile memory and that memory caches and other memory devices (not shown) may be connected to memory bus 103.

Peripheral devices including, but not limited to, memory 121, display 122, I/O device 123, and network connection device 124 can be connected to CPU 101 via an I/O bus 104. Memory 121 is a device for storing data on a media. Some examples of memory 121 can include read/write compact discs (CDs) and magnetic disk drives. Display 122 can be a monitor or display and associated drivers that convert data to a display. I/O device 123 can be a keyboard, a pointing device, or other device that may be used by a user to input data. Network device 124 can be a modem or Ethernet "card" that connects processing system 100 to a network. One skilled in the art will recognize that the exact configuration and devices of processing system 100 may vary depending upon the operations to be performed in the network.

Figure 2:
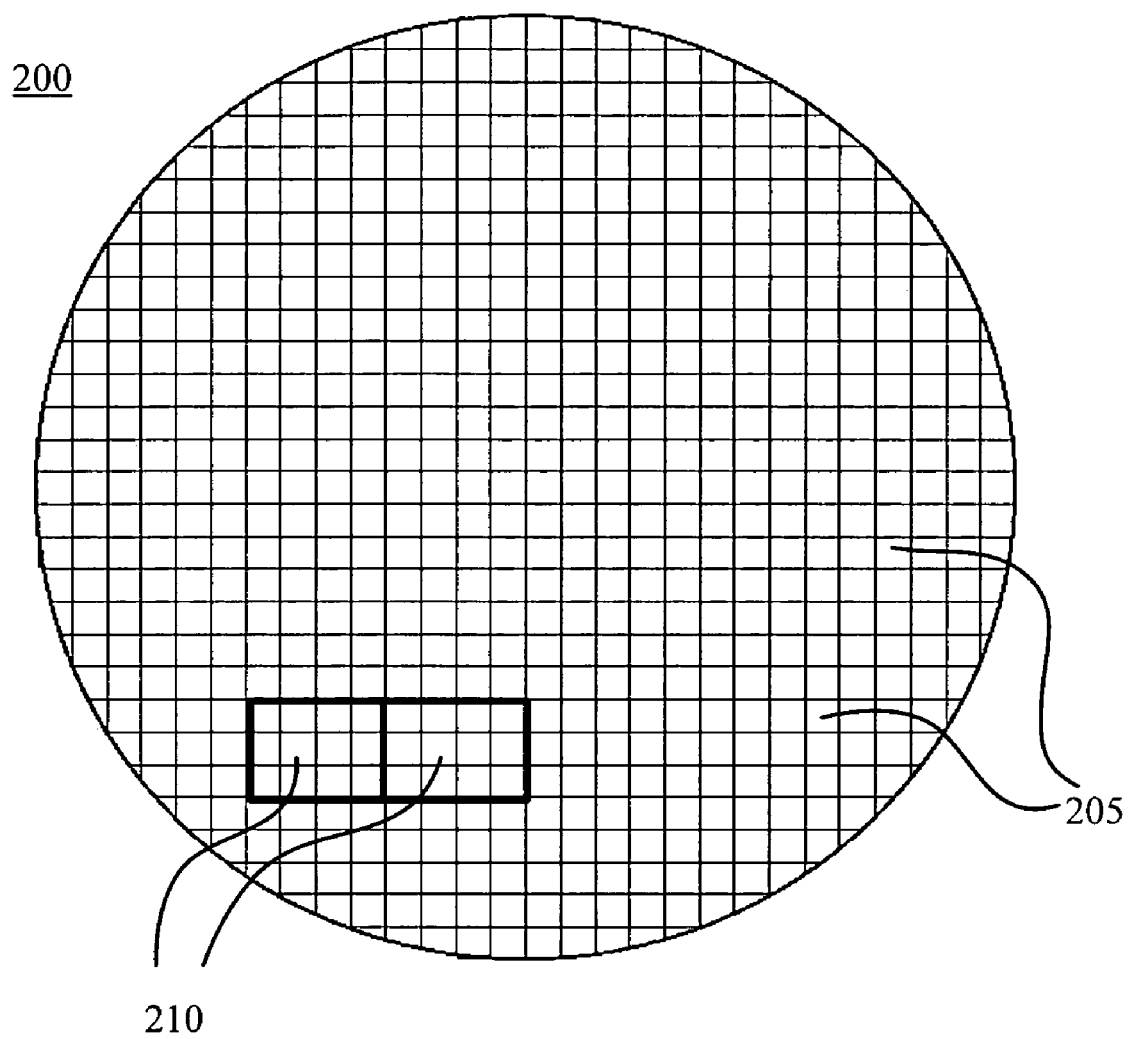
FIG. 2 illustrates a wafer of IC dies having cells.

FIG. 2 illustrates an image of a wafer 200. Wafer 200 includes dies 205. Each die 205 is an individual integrated circuit (IC). In accordance with one embodiment, wafer 200 can be divided into M×N cells 210. Notably, the location, size, and area of each cell 210 may or may not be related to the location, size, and area of dies 205 in wafer 200.

The number of spatial failures in each cell of a wafer can be calculated from an input array of failure coordinates of a wafer. The failure array can include the number of spatial failures counted at each coordinate. That number can form a failure matrix expressed as:

$$D_{mn} = \begin{matrix} d_{1,1} & \cdots & d_{M,1} \\ \vdots & \ddots & \vdots \\ d_{1,N} & \cdots & d_{M,N} \end{matrix}$$

where d is the number of spatial failures and each $d_{x,y}$ the number of failures in each cell (x,y).

The total number of spatial failures in a wafer is then the sum of the number of failures in each cell, which is expressed as $$D_{M,N} = \sum_{m=1}^{M}\sum_{n=1}^{N} d_{m,n} = \sum_{m=1, n=1}^{M,N} d_{m,n}$$

Thus, results of the spatial failure detection depend upon the resolution (M, N) chosen for the cell. A resolution having too small values for M and N can result in the loss of important details in the wafer. For example, details can be lost because adjacent spatial failures may be merged into one spatial failure as the resolution is lowered. On the other hand, a resolution having too large values for M and N can result in a large number of unnecessary details. Thus, a high resolution requires more memory and processing time.

Figure 3:
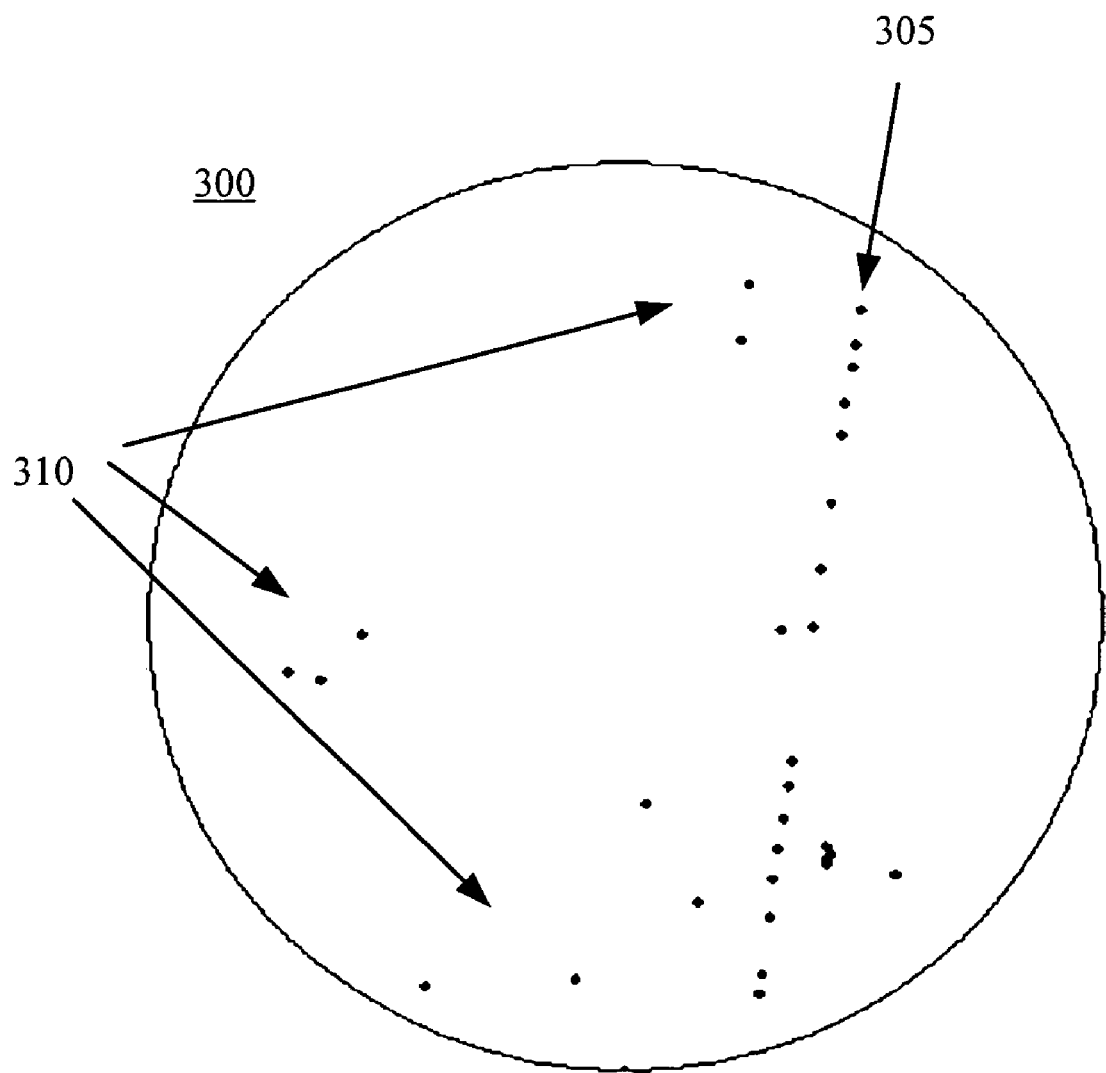
FIG. 3 illustrates a first resolution image of spatial failures on a wafer.
Figure 4:
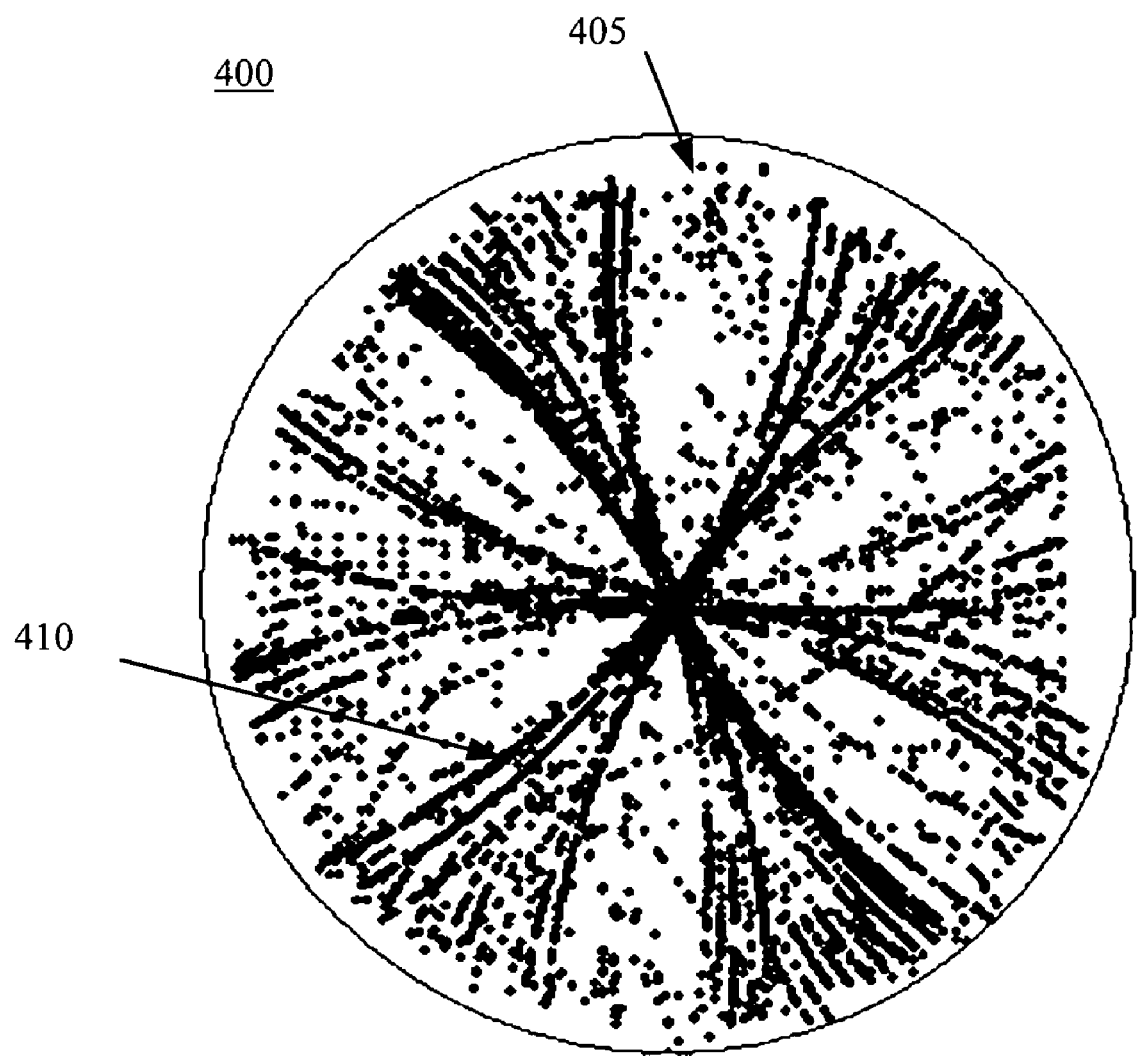
FIG. 4 illustrates a second resolution image of spatial failures on the wafer of FIG. 3.

FIG. 3 illustrates an image 300 of a wafer with a low resolution. In image 300, linear object 305 can be distinguished from isolated spatial failures 310, but other objects cannot be detected. In contrast, FIG. 4 illustrates an image 400 of the wafer shown in FIG. 3 where a higher resolution is used. In image 400, many more isolated spatial failures 405 and even arc objects 410 can be detected, albeit with additional system resources. Therefore, in one embodiment, processing system 100 (FIG. 1) can automatically vary the resolution used to view the spatial failures of the wafer, thereby allowing optimization of spatial failure detection as well as system resources.

Figure 5:
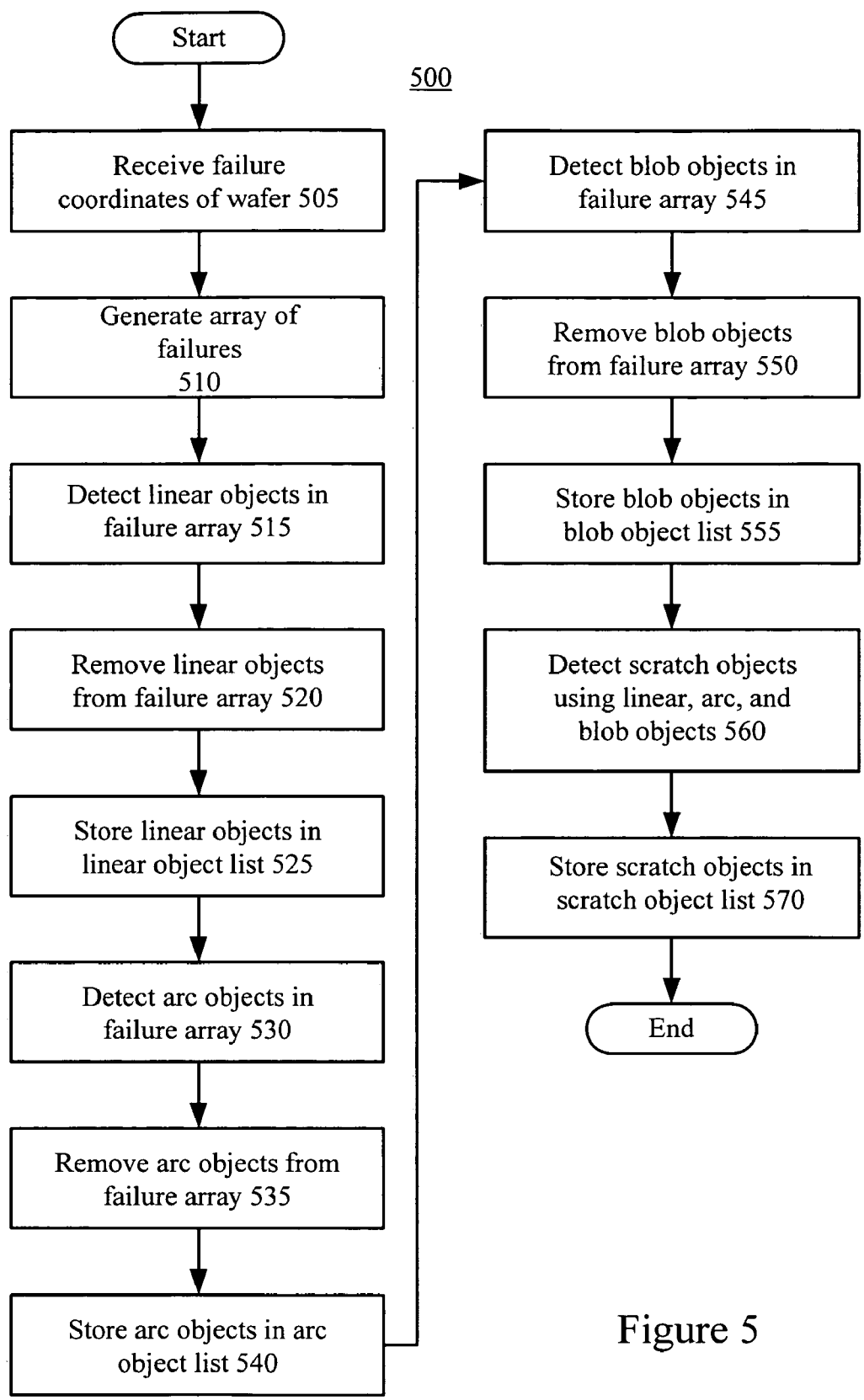
FIG. 5 illustrates a process that can advantageously detect spatial failures in a wafer using transforms and cluster signature analysis.

FIG. 5 illustrates a process 500 that can advantageously detect spatial failure objects in a wafer using transforms and cluster signature analysis. In process 500, four types of spatial failure objects can be detected: linear, arc, blob, and scratch objects. As used herein, a scratch object is defined as a combination of at least two objects (i.e. linear, arc, or blob objects).

Process 500 begins in step 505 by receiving the spatial failure coordinates of that wafer. From those coordinates, step 510 can generate an array of spatial failures (called a failure array herein) using a selected resolution. In some embodiments, the failure array can be received as input (based on a selected resolution), thereby making step 505 optional.

Step 515 can detect linear objects from the spatial failures in the failure array using transforms. Step 520 removes the spatial failures included in the linear objects from the failure array. The detected linear objects are then stored in a linear object list in step 525.

Step 530 can detect arc objects from the spatial failures remaining in the failure array using transforms. Step 535 removes the spatial failures included in the arc objects from the failure array. The detected arc objects are then stored in an arc object list in step 540.

Step 545 can detects blob objects from the spatial failures remaining in the failure array using cluster signature analysis. Step 550 removes the failures included in the blob objects from the failure array. The detected blob objects are then stored in a block object list in step 555.

Step 560 detects scratch objects from the previously detected linear, arc, and blob objects. The detected scratch objects are then stored in a scratch object list in step 570 and process 500 ends.

As indicated above, transforms can be used to detect certain spatial failure objects, i.e. linear and arc objects, from spatial failures. In transforms, pixel direction is used. The pixel direction for a particular pixel is determined based upon marked pixels in the neighborhood of the particular pixel. The pixel direction indicates direction from the particular pixel that has the greatest concentration of marked pixels near the particular pixel.

Figure 6:
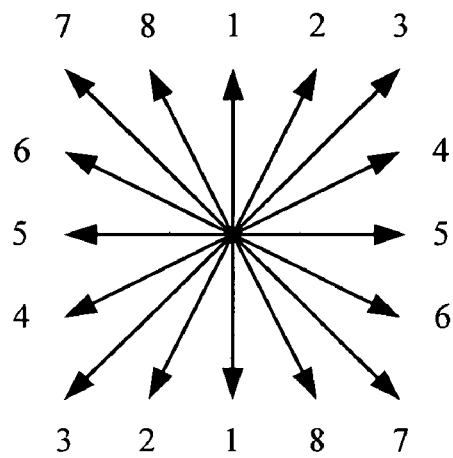
FIG. 6 illustrates pixel directions for a spatial failure.

In one embodiment, K discrete pixel directions are provided, wherein the directions are numbered clockwise starting from vertical. Thus, each integer from 1-K is a different direction. FIG. 6 shows a pixel 600 with each pixel direction being given a value of 1-8 to indicate the closest concentration of marked pixels. The directions are numbered 1-8 in a clockwise direction starting from the vertical axis.

To describe the determination of pixel direction, the following matrix of pixel directions for each pixel is used.

$$M^{dir} = \begin{matrix} 7 & 7 & 8 & 1 & 1 & 1 & 2 & 3 & 3 \\ 7 & 7 & 8 & 8 & 1 & 2 & 2 & 3 & 3 \\ 8 & 6 & 7 & 8 & 1 & 2 & 3 & 4 & 4 \\ 5 & 6 & 6 & 7 & 1 & 3 & 4 & 4 & 5 \\ 5 & 5 & 5 & 5 & 1 & 5 & 5 & 5 & 5 \\ 5 & 4 & 4 & 3 & 1 & 7 & 6 & 6 & 5 \\ 4 & 4 & 3 & 2 & 1 & 8 & 7 & 6 & 6 \\ 3 & 3 & 2 & 2 & 1 & 8 & 8 & 7 & 7 \\ 3 & 3 & 2 & 1 & 1 & 1 & 8 & 7 & 7 \end{matrix}$$

where M is a matrix of pixel direction number $m_{x,y}$ that corresponded to the directions shown in FIG. 6.

The matrix M can be overlain on an image corresponding to the failure array with the center of M aligned to the pixel for which the pixel direction is being calculated. A direction predicate for each pixel is determined by the following formula:

$$\hat{V}_{m,n}(t) = \begin{cases} 1, & \text{if } M^{dir}(m,n) = t \\ 0, & \text{otherwise} \end{cases}$$

Preliminary estimates of pixel direction are calculated based upon the direction predicates from the following equation:

$$V_{m,n}(t) = \begin{cases} \sum_{i,j=-4}^{4} \hat{v}_{m+i,n+j} \times d_{m+i,n+j}, & \text{if } 4 \le m \le -4, 4 \le n \le N-4, t = \overline{1,8} \\ 0, & \text{otherwise} \end{cases}$$

the result is a vector of 8 values, one value for each direction, for each pixel given by the following equation:

$$\lfloor v_{m,n}(t) mt = \overline{1-8} \rfloor.$$

The vector is then sorted to arrange the pixels in a descending order which produces:

$$\lfloor v'_{m,n}(t), t = \overline{1-8} \rfloor$$

The pixel direction of a pixel is then calculated as:

$$d^{dir}_{m,n} = \begin{cases} v'_{m,n}(1), & \text{if } v'_{m,n}(1) - v'_{m,n}(2) > 2 \\ 0, & \text{otherwise} \end{cases}$$

from the above equations, a given matrix, D, produces the following corresponding matrix of pixel directions:

$$D^{dir}_{M,N} = \begin{matrix} d^{dir}_{1,1} & \cdots & d^{dir}_{M,1} \\ \vdots & \ddots & \vdots \\ d^{dir}_{1,N} & \cdots & d^{dir}_{M,N} \end{matrix}$$

This matrix is then used to determine whether individual spatial failures belong to a particular object.

Figure 7:
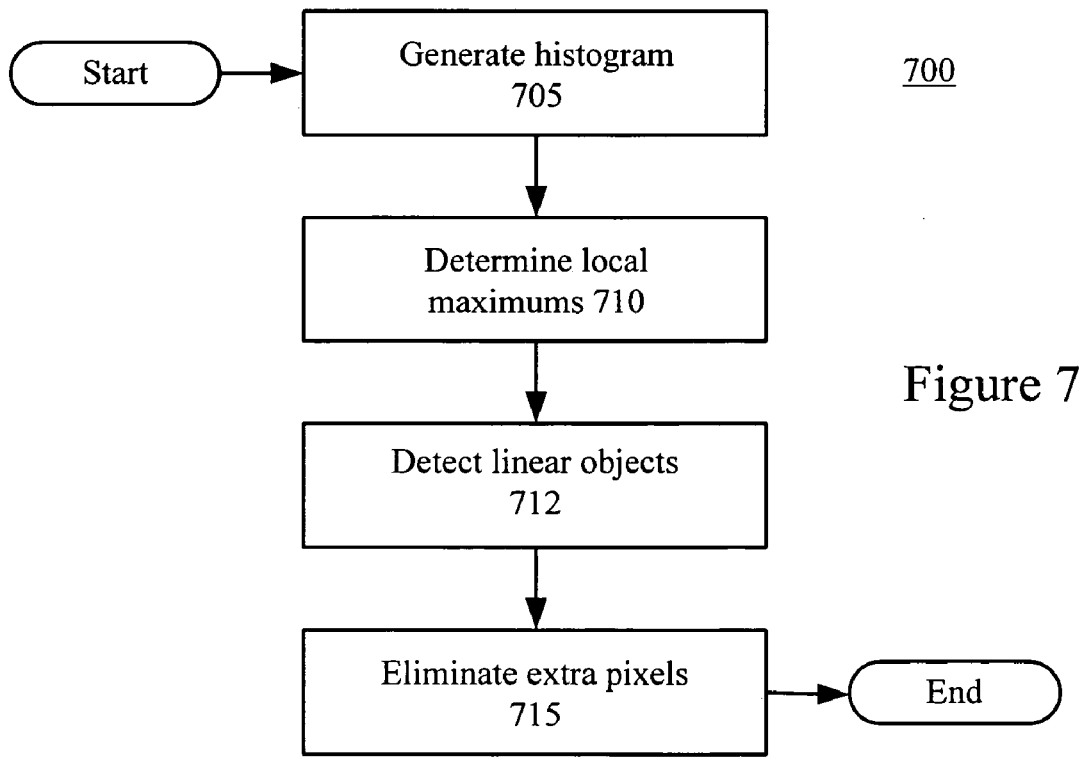
FIG. 7 illustrates one embodiment of a process for detecting linear objects using a Hough-Radon Transform technique.

FIG. 7 illustrates one embodiment of a process 700 for detecting linear objects using a Hough-Radon Transform technique. This transform is a commonly used technique to detect a straight line in an image. An example of the use of the Hough-Radon technique in detecting straight lines is given in "Biomedical Image Analysis", Rangaraj M. Rangayyan, published by CRC Press (Biomedical Engineering Series) in 2004 (Chapter 5).

Typically, a line in XY space is defined as:

$$y = mx + b.$$

The Hough-Radon Transform uses the following definition of a line:

$$x \cos \theta + y \sin \theta = \rho$$

where $\rho$ is a distance from the center of the coordinates and $\theta$ is the angle better the perpendicular of the line and the x axis. Thus, each element $d_{x,y}$ of matrix $D_{M,N}$ transform id transformed into a sinusoidal curve. $\rho = x_i \cos \theta + y_i \sin \theta$ in the $(\rho, \theta)$ plane.

In process 700, a two-dimensional histogram of the failure array is then generated using a Hough Transform as described above in step 705. Local maximums of the histogram are then determined in step 710. A local maximum is a necessary but not sufficient condition to classify a collection of spatial failures as an object. Thus, in step 712, histogram peak tests, as described below, can also be used to detect linear objects.

Specifically, to determine whether the collection of spatial failures is an object, the following tests can be used.

Average $< C_1$
Standard Deviation $< C_2$
Skewness $< C_3$
Kurtosis $\times (\text{Max}_{mn} - \text{Min}_{mn}) < C_5$ where $C_1$-$C_5$ are predefined constants that can be determined experimentally based upon a representative set of wafer failure data and the results of classification.

To test other conditions, a covering matrix must be generated. In one embodiment, a covering matrix is a matrix with a particular pixel as center and extending outward 10 pixels in every direction. The equation for the centering matrix is:

$$R_{uu} = \{(x', y') : |x - x'| \leq 10, |y - y'| \leq 10\}$$

The covering matrix can then be divided into sub-covering matrices where each sub-covering matrix is a 7×7 matrix. The average for each sub-covering matrix is defined as:

$$R_{avg.} = \begin{pmatrix} R_{avg}(0,0) & R_{avg}(1,0) & R_{avg}(2,0) \\ R_{avg}(0,1) & R_{avg}(1,1) & R_{avg}(2,1) \\ R_{avg}(0,2) & R_{avg}(1,2) & R_{avg}(2,2) \end{pmatrix}$$

where $$R_{avg}(i,j) = \frac{\sum_{m=7*i}^{7*(i+1)} \left( \sum_{n=7*j}^{7*(j+1)} \mu(m,n) \right)}{49} \, i, j = \overline{0,2}$$

The averages are then compared with the following sets of conditions to determine whether the collection is a linear object (i.e. a line):

$$\frac{R_{avg}(0,1)}{R_{avg}(0,0)} < C_{avg} \text{ and } \frac{R_{avg}(0,1)}{R_{avg}(0,2)} <$$

$$C_{avg} \text{ and } \frac{R_{avg}(1,1)}{R_{avg}(1,0)} < C_{avg} \text{ and } \frac{R_{avg}(1,1)}{R_{avg}(1,2)} <$$

$$C_{avg} \text{ AND } \frac{R_{AVG}(2,1)}{R_{AVG}(2,0)} < C_{AVG} \text{ AND } \frac{R_{AVG}(2,1)}{R_{AVG}(2,2)} < C_{AVG}$$

Figure 8:
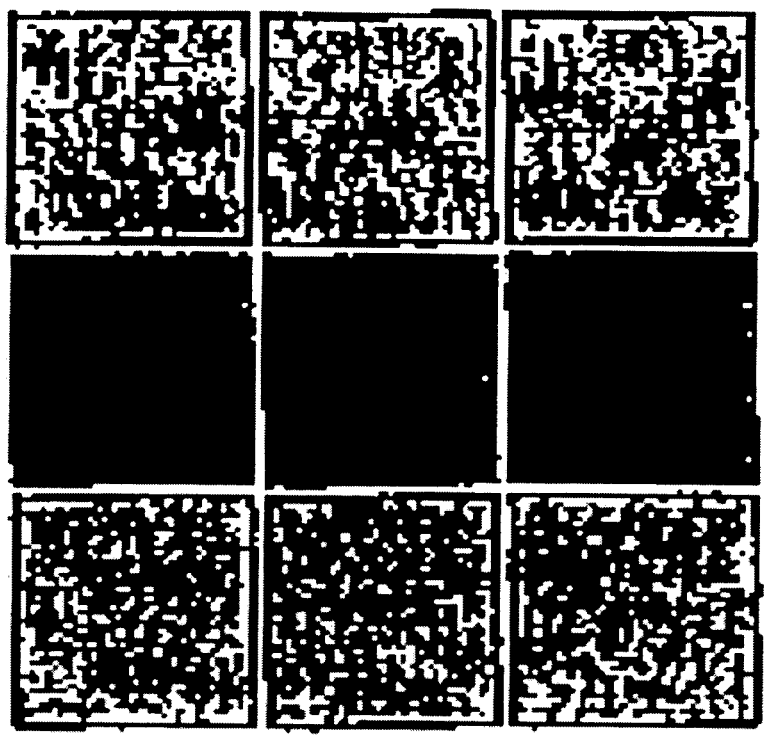
FIG. 8 illustrates a first template that can test for a horizontal line.

This relationship tests for a horizontal line in the sub-covering matrix as shown by template 800 of FIG. 8.

$$\frac{R_{avg}(0,1)}{R_{avg}(0,0)} < C_{avg} \text{ and } \frac{R_{avg}(0,1)}{R_{avg}(2,0)} <$$

-continued $$C_{avg} \text{ and } \frac{R_{avg}(1,1)}{R_{avg}(0,1)} < C_{avg} \text{ and } \frac{R_{avg}(1,1)}{R_{avg}(2,1)} <$$

$$C_{avg} \text{ AND } \frac{R_{AVG}(2,1)}{R_{AVG}(0,2)} < C_{AVG} \text{ AND } \frac{R_{AVG}(2,1)}{R_{AVG}(2,2)} < C_{AVG}$$

Figure 9:
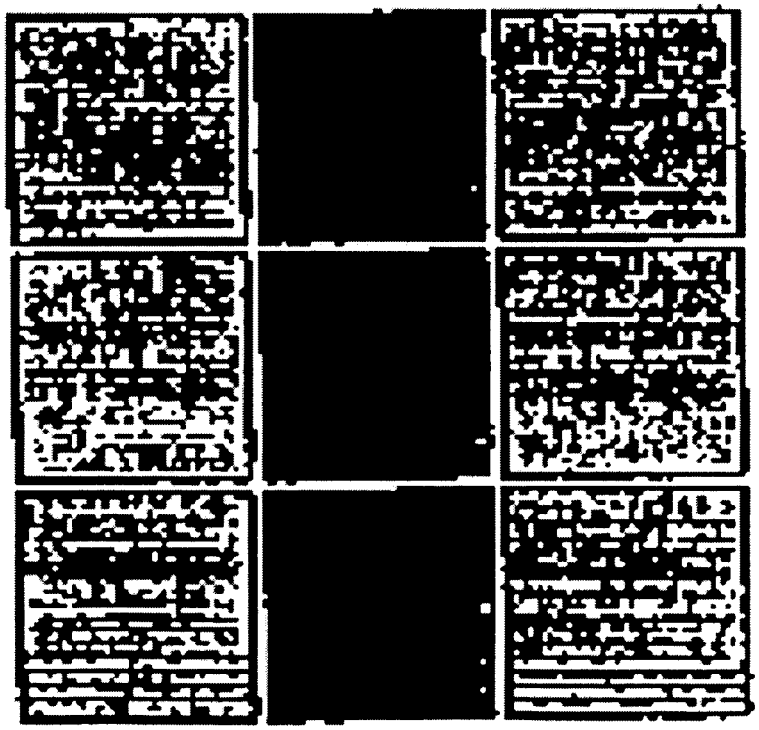
FIG. 9 illustrates a second template that can test for a vertical line.

This relationship checks for a vertical line of pixels as shown in template 900 shown in FIG. 9.

$$\frac{R_{avg}(0,0)}{R_{avg}(0,1)} < C_{avg} \text{ and } \frac{R_{avg}(0,0)}{R_{avg}(1,0)} <$$

$$C_{avg} \text{ and } \frac{R_{avg}(1,1)}{R_{avg}(0,2)} < C_{avg} \text{ and } \frac{R_{avg}(1,1)}{R_{avg}(2,0)} <$$

$$C_{avg} \text{ AND } \frac{R_{AVG}(2,2)}{R_{AVG}(1,2)} < C_{AVG} \text{ AND } \frac{R_{AVG}(2,2)}{R_{AVG}(2,1)} < C_{AVG}$$

Figure 10:
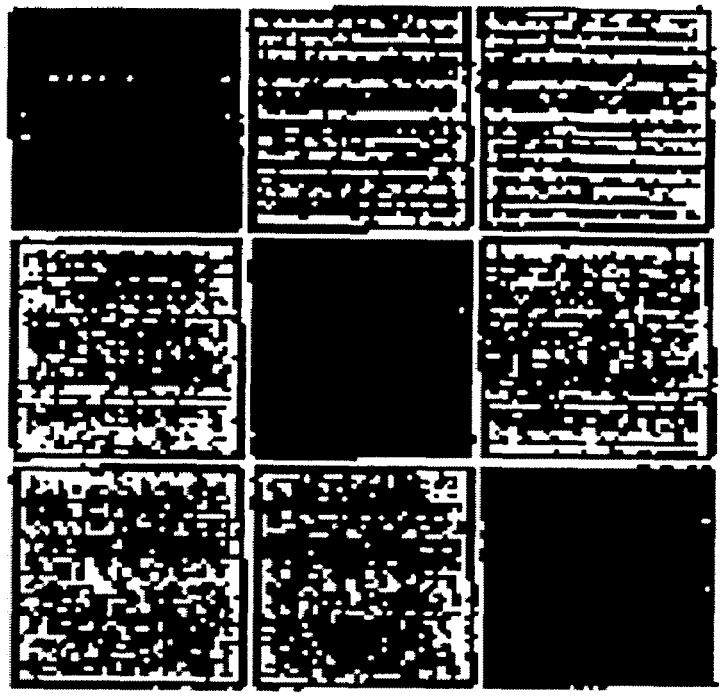
FIG. 10 illustrates a third template that can test for a first diagonal line.

This relationship tests for a first diagonal in a sub-covering matrix as shown by template 1000 of FIG. 10.

$$\frac{R_{avg}(2,0)}{R_{avg}(1,0)} < C_{avg} \text{ and } \frac{R_{avg}(2,0)}{R_{avg}(2,1)} <$$

$$C_{avg} \text{ and } \frac{R_{avg}(1,1)}{R_{avg}(0,0)} < C_{avg} \text{ and } \frac{R_{avg}(1,1)}{R_{avg}(2,2)} <$$

$$C_{avg} \text{ AND } \frac{R_{AVG}(0,2)}{R_{AVG}(0,1)} < C_{AVG} \text{ AND } \frac{R_{AVG}(0,2)}{R_{AVG}(1,2)} < C_{AVG}$$

Figure 11:
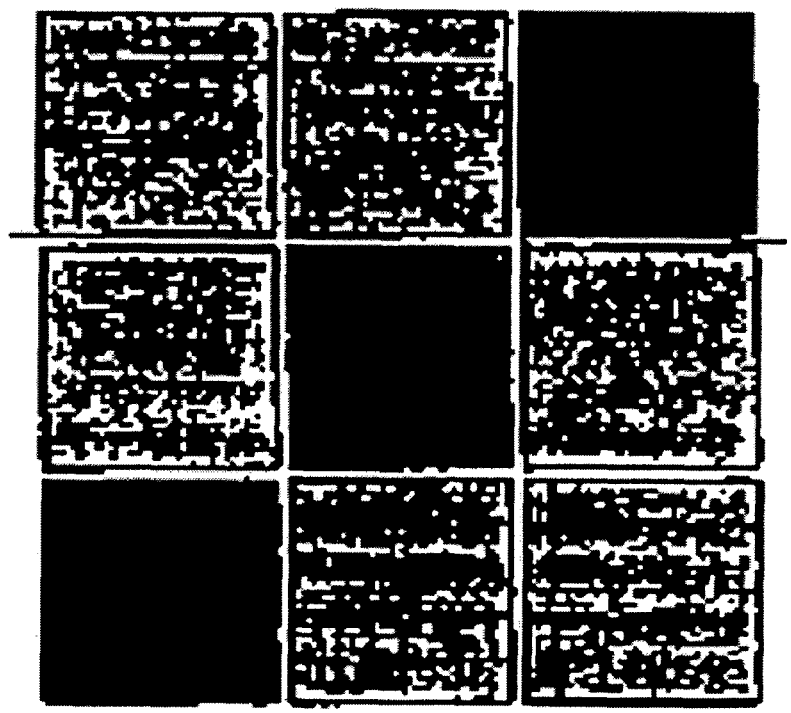
FIG. 11 illustrates a fourth template that can test for a second diagonal line.

This relationship tests for a second diagonal in the sub-covering matrix shown by template 1100 shown in FIG. 11. In each of these above tests $C_{avg} < 1$.

The maximum for each sub-covering matrix is defined as:

$$R_{\max} = \begin{pmatrix} R_{\max}(0,0) & R_{\max}(1,0) & R_{\max}(2,0) \\ R_{\max}(0,1) & R_{\max}(1,1) & R_{\max}(2,1) \\ R_{\max}(0,2) & R_{\max}(1,2) & R_{\max}(2,2) \end{pmatrix}$$

where $$R_{\max} = \max_{\substack{m = 7*i, 7*(i+1) \\ n = 7*j, 7*(j+1)}} \mu(m,n), \, i, j = \overline{0,2}$$

The maximums of the sub-covering matrices are then compared with the following sets of conditions to determine whether the collection is a linear object:

$$\frac{R_{\max}(0,1)}{R_{\max}(0,0)} < C_{\max} \text{ and } \frac{R_{\max}(0,1)}{R_{\max}(0,2)} <$$

$$C_{\max} \text{ and } \frac{R_{\max}(1,1)}{R_{\max}(1,0)} < C_{\max} \text{ and } \frac{R_{\max}(1,1)}{R_{\max}(1,2)} <$$

$$C_{\max} \text{ AND } \frac{R_{\max}(2,1)}{R_{\max}(2,0)} < C_{\max} \text{ AND } \frac{R_{\max}(2,1)}{R_{\max}(2,2)} < C_{\max}$$

This relationship tests for a horizontal line in the sub-covering matrix as shown in by template 800 of FIG. 8.

$$\frac{R_{\max}(0,1)}{R_{\max}(0,0)} < C_{\max} \text{ and } \frac{R_{\max}(0,1)}{R_{\max}(2,0)} <$$

$$C_{\max} \text{ and } \frac{R_{\max}(1,1)}{R_{\max}(0,1)} < C_{\max} \text{ and } \frac{R_{\max}(1,1)}{R_{\max}(2,1)} <$$

$$C_{\max} \text{ AND } \frac{R_{\max}(2,1)}{R_{\max}(2,0)} < C_{\max} \text{ AND } \frac{R_{\max}(2,1)}{R_{\max}(2,2)} < C_{\max}$$

This relationship checks for a vertical line of pixels as shown in template 900 shown in FIG. 9.

$$\frac{R_{\max}(0,0)}{R_{\max}(0,1)} < C_{\max} \text{ and } \frac{R_{\max}(0,0)}{R_{\max}(1,0)} <$$

$$C_{\max} \text{ and } \frac{R_{\max}(1,1)}{R_{\max}(0,2)} < C_{\max} \text{ and } \frac{R_{\max}(1,1)}{R_{\max}(2,0)} <$$

$$C_{\max} \text{ AND } \frac{R_{\max}(2,2)}{R_{\max}(1,2)} < C_{\max} \text{ AND } \frac{R_{\max}(2,2)}{R_{\max}(2,1)} < C_{\max}$$

This relationship tests for a first diagonal in a sub-covering matrix as shown by template 1000 of FIG. 10.

$$\frac{R_{\max}(2,0)}{R_{\max}(1,0)} < C_{\max} \text{ and } \frac{R_{\max}(2,0)}{R_{\max}(2,1)} <$$

$$C_{\max} \text{ and } \frac{R_{\max}(1,1)}{R_{\max}(0,0)} < C_{\max} \text{ and } \frac{R_{\max}(1,1)}{R_{\max}(2,2)} <$$

$$C_{\max} \text{ AND } \frac{R_{\max}(0,2)}{R_{\max}(0,1)} < C_{\max} \text{ AND } \frac{R_{\max}(0,2)}{R_{\max}(1,2)} < C_{\max}$$

This relationship tests for a second diagonal in the sub-covering matrix shown by template 1100 shown in FIG. 11.

In each of the above tests $c_{max} < 1$ must be satisfied when choosing $C_{max}$. Note that to be identified as an object, a matrix has to satisfy just one of the above-described maximum or average relationship tests.

Figure 12:
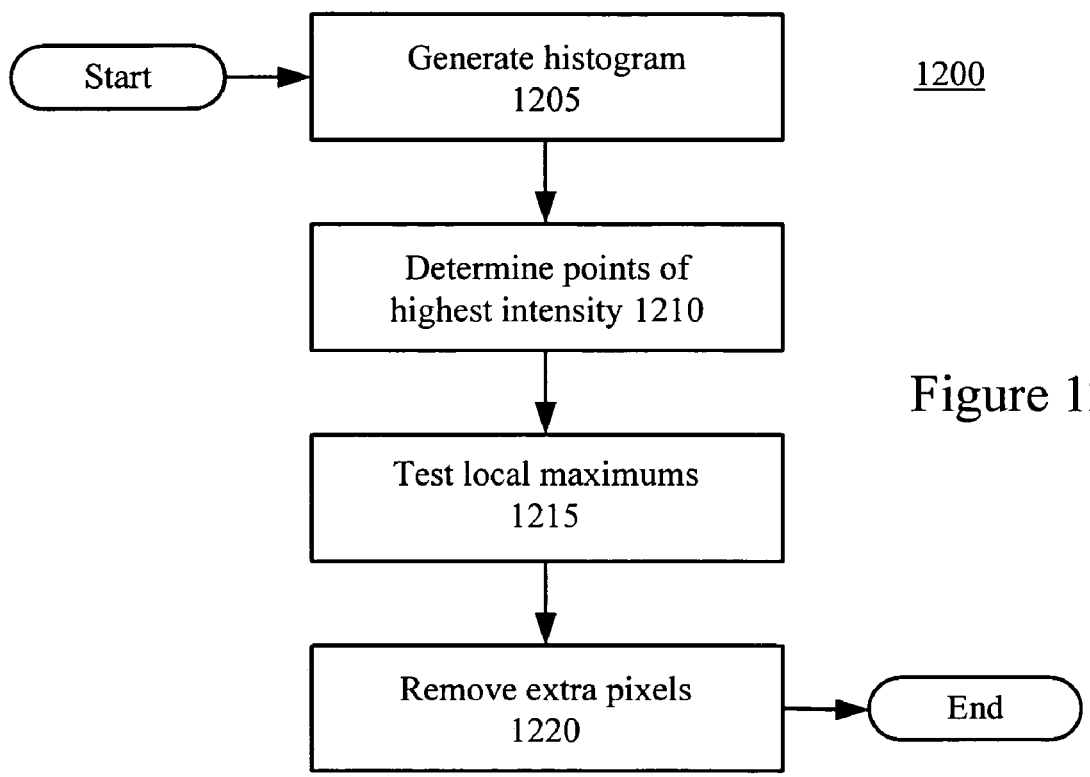
FIG. 12 illustrates one embodiment of a process for detecting arc object using a Hough circle transform.

After a potential linear object is detected as a collection of pixels, the collection of pixels is narrowed using pixel directions. This narrowing can be done by eliminating pixels having a direction that is different from the direction of the majority of the pixels in step 715. At this point, process 700 ends An exemplary process 1200 for arc detection is illustrated in FIG. 12. From simple geometry, a circle is defined as:

$$(x-a)^2 + (y-b)^2 = R^2,$$

where a and b are the coordinates of the center of a circle having a radius R. Thus, for points to belong to an arc with a center at (a,b) and radius R all circles having a center point along path of the arc will cross at the center point of the circle (a,b). Thus, a Hough circle transform may be used to detect arc objects using a process that iterates through various radii in a range of $R_{min}$ to $R_{max}$. In step 1205, for each R, a two-dimensional histogram can be generated by calculating circles having a radius R with a center point at each spatial failure. The value of the histogram is the numbers of circles that pass through a cell.

Local maximums of the histogram (i.e. points of highest intensity) can be determined in step 1210. The local maximums are possible arc objects. The local maximums are then tested in step 1215 to detect arc objects as described above for testing line objects in step 712 of FIG. 7. Extra pixels are then removed from arc objects in step 1220 based upon the pixel direction matrix and process 1200 ends.

After linear and arc objects are detected and identified, blob and scratch objects can be detected from the remaining spatial failures. To determine blob and scratch objects, a predefined distance k between spatial failures and a predefined number of spatial failures defining a blob/scratch object are chosen. The distance k should be small enough not to miss blob and scratch objects. The number should be sufficiently large to remove some spatial failures from consideration. For example, for a wafer template having a grid of 300×300 cells, the number could be three for blob objects and six for scratch objects. Thus, a blob object or a scratch object each comprises a number of spatial failures within the predefined distance from one another.

Figure 13:
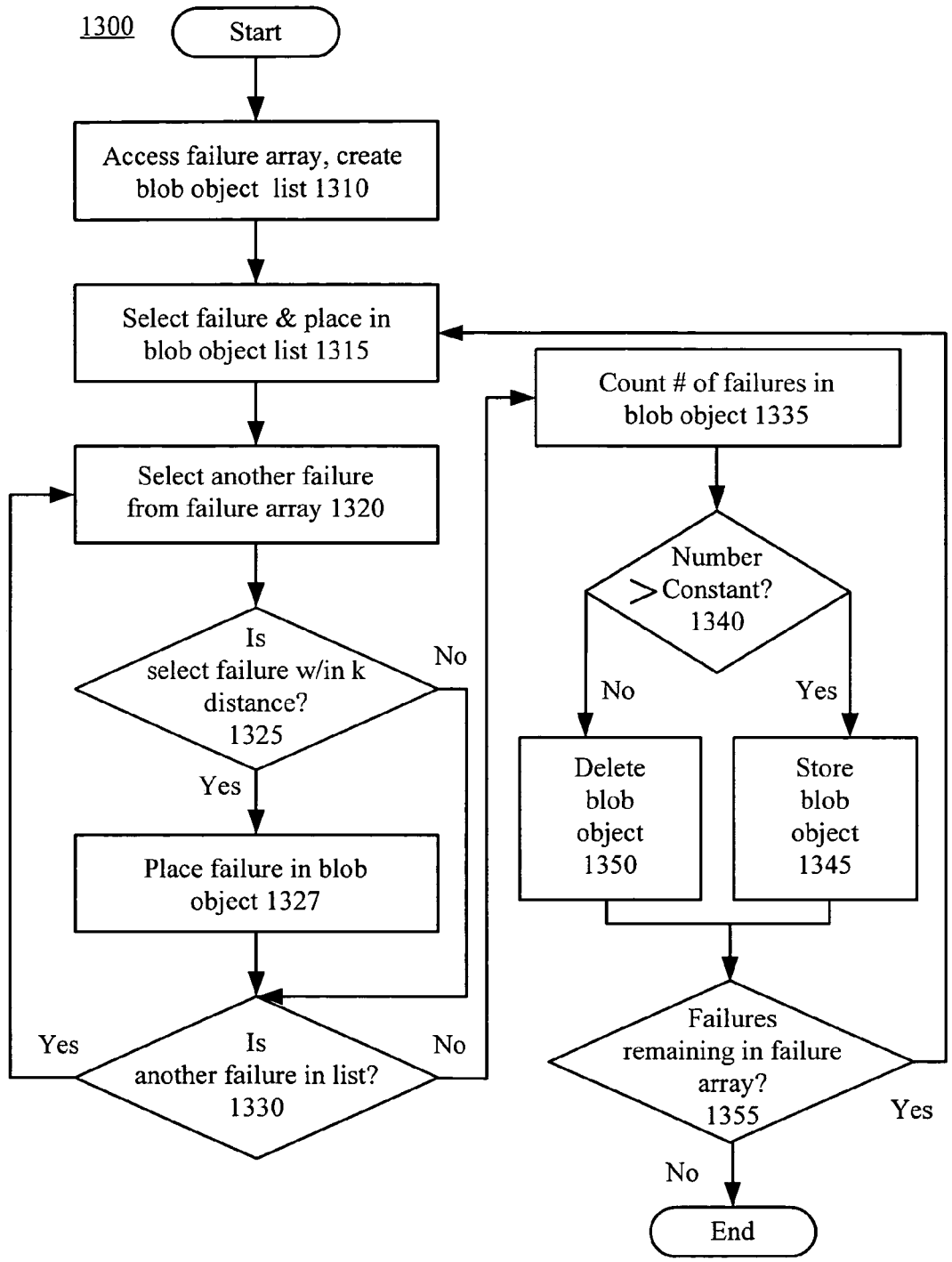
FIG. 13 illustrates a process for detecting blob objects using cluster signature analysis.

FIG. 13 illustrates a process 1300 for detecting blob objects using cluster signature analysis. Step 1310 starts by accessing the failure array (after linear and arc objects have been identified) and creating a blob object list. In step 1315, a first spatial failure is selected from the failure list, designated as a blob object in the blob object list, and removed from the failure array. In step 1320, another spatial failure is selected from the failure array. Step 1325 determines whether the other spatial failure is within distance k of the first spatial failure (selected in step 1310) in accordance with the following equation:

$$dist(OBJ, D) = \max_{D_1 \in OBJ} dist(D_i, D) < k.$$

If the other selected spatial failure is within distance k of the first spatial failure, then the other selected failure can be added to the blob object (defined by the first failure in step 1315) and removed from the failure array in step 1327. If the spatial failure is not within distance k or after step 1327, then step 1330 can determine whether there is another spatial failure remaining in the failure array. If there is another spatial failure, then process 1300 returns to step 1320 to select another spatial failure and repeat steps 1325, 1327, and 1330.

If no other spatial failures are in the failure array, as determined in step 1330, then step 1335 counts the number of spatial failures associated with the current blob object. If the number is greater than the constant, as determined in step 1340, then the current blob object can be stored in the blob object list in step 1345. In one embodiment, the constant can be empirically chosen. In another embodiment, a user can set the constant. Preferably, the constant defines significant blob objects. If the number of spatial failures constituting the blob object is less than the constant, then the blob object can be deleted and the spatial failures constituting that blob object can be re-inserted into the failure array in step 1350.

After step 1345 or step 1350, step 1355 determines whether spatial failures remain in the failure array. If there is are spatial failures remaining, then process 1300 returns to step 1315 to define a new blob object. Otherwise, process 1300 ends.

A scratch object can be defined as a meta-object that includes at least two objects, i.e. any two of linear objects, arc objects, and blob objects. Therefore, the identification of linear, arc, and blob objects should be completed prior to scratch object detection. Notably, scratch object detection can be based on substantially the same clustering process used to detect blob objects. However, in scratch object detection, the clustering is applied to an object rather than a spatial failure.

That is, a linear, arc, or blob object is a set of spatial failures whereas a scratch object is set of linear, arc, and blob objects.

Figure 14:
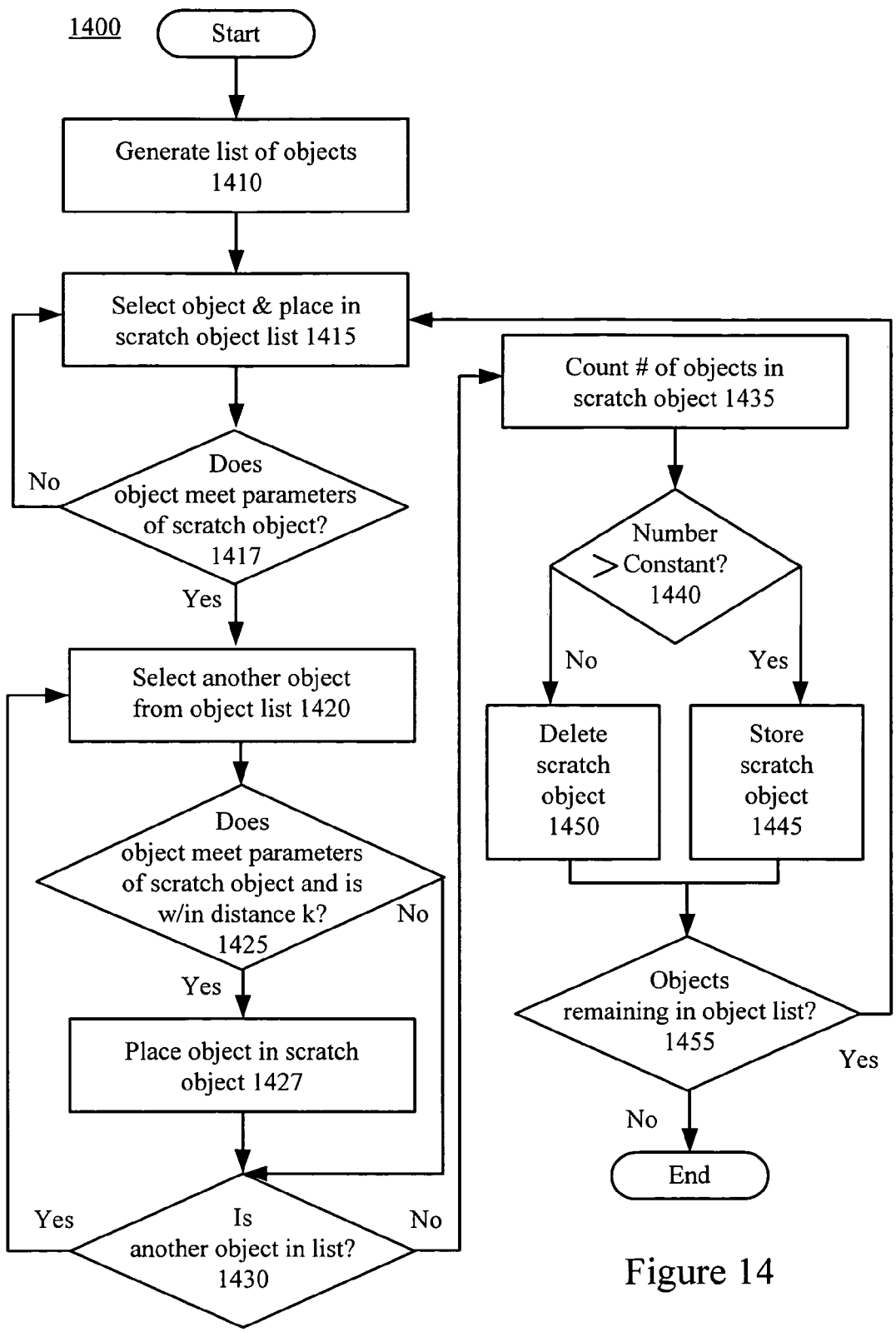
FIG. 14 illustrates a process for detecting scratch objects using cluster signature analysis.

FIG. 14 illustrates an exemplary process 1440 that can identify scratch objects. Process 1400 starts by generating a list of objects (e.g. compiling the stored linear, arc, and blob objects) in step 1410. In step 1415, a first object can be selected from that object list, removed from that object list, and inserted in a scratch object list. Step 1417 can determine whether the first object meets the parameters of a scratch object. In one embodiment, scratch objects can include small and thin objects. For example, small and thin can be defined for linear and arc objects as having a length<$L_{max}$ and for blob objects as having a width<$W_{max}$. Note that $L_{max}$ and $W_{max}$ may be set by a user or may be determined from prior observation of spatial failures on a wafer. If the first object does not meet the parameters for a scratch object, then process 1400 can re-insert the first object into the object list and then select another first object in step 1415.

If the first object does meet the parameters for a scratch object, then another object can be selected from the object list in step 1420. Step 1425 can determine whether the other object also meets the parameters for a scratch object and is within distance k of the first object. In one embodiment, the same parameter test performed in step 1417 can be applied to the other object in step 1425. If the other object does not meet the parameters for a scratch object, then process 1400 can immediately proceed to step 1430 (described below) without determining the other object's distance to the first object. Moreover, that other object can be re-inserted into the object list.

If the other object meets the parameters of a scratch object, then step 1425 can also determine the distance between the selected object and the first object. In one embodiment, the distance between the first and other objects can be defined as the smallest distance between one spatial failure in the first object and one spatial failure in the other object. Thus, the distances between each spatial failure in the first object and all spatial failures in the other object are determined and the shortest distance between spatial failures in the objects is then selected as the distance between objects. At this point, step 1425 can determine whether the other object is within distance k of the first object. If not, then process 1400 can proceed to step 1430 (described below) and re-insert the selected object into the object list.

If the objects are within k distance, then the object can be added to the scratch object in the scratch object list in step 1427. Step 1430 can determine whether another object is in the object list. If so, then process 1400 returns to step 1420 to select another object and repeats steps 1425, 1427, and 1430.

If there is not another object in the object list, then step 1435 can count the number of objects in the scratch object. Step 1440 can determine whether that number is greater than a constant. Note that the constant may be set by a user or may be empirically determined through observation of wafer characteristics. If the number of objects not greater than the constant, then that scratch object can be deleted and all objects included in that scratch object other than the first object are re-inserted into the object list of objects in step 1450 (that is, the first object conclusively does not form part of a scratch object and therefore should not be reconsidered in subsequent iterations of process 1400).

If the number of objects in the scratch object is greater than the constant, then that scratch object can be stored in the scratch object list in step 1445. After step 1445 or step 1450, step 1455 can determine whether there are any objects remaining in the object list. If so, then process 1400 returns to step 1415 to select another first object. Otherwise, process 1400 ends.

Although illustrative embodiments of the invention have been described in detail herein with reference to the accompanying figures, it is to be understood that the invention is not limited to those precise embodiments. They are not intended to be exhaustive or to limit the invention to the precise forms disclosed. As such, many modifications and variations will be apparent. Accordingly, it is intended that the scope of the invention be defined by the following Claims and their equivalents.

The invention claimed:

1. A method for detecting spatial failures in a wafer, the method comprising:
using a processing system including a processor, to perform at least the following steps:
receiving failure coordinates for the wafer, each failure coordinate indicating a spatial failure;
generating a failure array based on a resolution of the failure coordinates;
detecting a first set of objects in the failure array using transformations;
detecting a second set of objects in the failure array using cluster signature analysis; and
detecting a third set of objects in the failure array, the third set of objects being combinations of at least two objects in the first and second sets of objects.

2. The method of claim 1, wherein detecting the first set of objects includes:
detecting first objects from spatial failures in the failure array;
removing spatial failures of each of the first objects from the failure array;
detecting second objects from spatial failures remaining in the failure array after the removing; and
removing spatial failures of each of the second objects from the failure array.

3. The method of claim 2, wherein the first and second objects include linear and arc objects.

4. The method of claim 3, wherein detecting the second set of objects includes:
detecting blob objects from spatial failures remaining in the failure array after removing spatial failures of each of the second objects from the failure array.

5. The method of claim 4, wherein detecting the third set of objects includes:
detecting scratch objects using the linear objects, arc objects, and blob objects.

6. The method of claim 3, wherein detecting a linear object comprises:
determining a pixel direction for each spatial failure in the failure array.

7. The method of claim 6, wherein detecting a linear object further comprises:
generating a histogram using a Hough transform of a matrix corresponding to the failure array.

8. The method of claim 7, wherein detecting a linear object further comprises:
determining local maximums from the histogram, wherein each local maximum indicates a potential linear object.

9. The method of claim 8, wherein detecting a linear object further comprises:
eliminating a spatial failure from each potential linear object proximate a local maximum based upon pixel direction of the spatial failure.

10. The method of claim 9, wherein detecting a linear object further comprises:
   generating a covering matrix from spatial failures surrounding a local maximum.

11. The method of claim 10, wherein detecting a linear object further comprises:
   determining a plurality of sub-covering matrices from the covering matrix.

12. The method of claim 11, wherein detecting a linear object further comprises:
   determining an average for each of the plurality of sub-covering matrices.

13. The method of claim 12, wherein detecting a linear object further comprises:
   identifying a linear object from an average of each sub-covering matrix.

14. The method of claim 11, wherein detecting a linear object further comprises:
   determining a maximum for each of the plurality of sub-covering matrices.

15. The method of claim 14, wherein detecting a linear object further comprises:
   identifying a linear object from a maximum of each sub-covering matrix.

16. The method of claim 3, wherein detecting an arc object comprises:
   determining a pixel direction for each spatial failures in the failure array.

17. The method of claim 16, wherein detecting an arc object further comprises:
   generating a histogram using a Hough circle transform of a matrix corresponding to the failure array.

18. The method of claim 17, wherein detecting an arc object further comprises:
   determining local maximums from the histogram, wherein each local maximum indicates a potential arc object.

19. The method of claim 18, wherein detecting an arc object comprises:
   eliminating a spatial failure from each potential arc object proximate a local maximum based upon pixel direction of the spatial failures.

20. The method of claim 19, wherein detecting an arc object comprises:
   generating a covering matrix from spatial failures surrounding a local maximum.

21. The method of claim 20, wherein detecting an arc object further comprises:
   determining a plurality of sub-matrices from the covering matrix.

22. The method of claim 21, wherein detecting an arc object further comprises:
   determining an average for each of the plurality of sub-covering matrices.

23. The method of claim 22, wherein detecting an arc object further comprises:
   identifying an arc object from an averages of each sub covering matrix.

24. The method of claim 21, wherein detecting an arc object further comprises:
   determining a maximum for each of the plurality of sub-covering matrices.

25. The method of claim 24, wherein detecting an arc object further comprises:
   identifying an arc object from a maximum of each sub-covering matrix.

26. The method of claim 4, wherein detecting a blob object comprises:
   creating a blob object list.

27. The method of claim 26, wherein detecting a blob object further comprises:
   selecting a first spatial failure from the failure array;
   designating the first spatial failure a blob object, adding the first spatial failure to a blob object list, and removing the first spatial failure from the failure array;
   determining a distance between the first spatial failure and each of any remaining spatial failure in the failure array; and
   if the distance is less than a constant, then adding that spatial failure to the blob object list as part of the blob object.

28. The method of claim 27, wherein detecting a blob object further comprises:
   if the distance is less than a constant, then removing that spatial failure from the failure array.

29. The method of claim 28, wherein detecting a blob object further comprises:
   deleting each blob object having less than a minimum number of spatial failures.

30. The method of claim 5, wherein detecting a scratch object comprises:
   generating a list of objects including each of said linear objects, arc objects, and blob objects detected.

31. The method of claim 30, wherein detecting a scratch objects further comprises:
   selecting a first object from the list of objects;
   determining whether the first object meets scratch object parameters;
   if so, then adding the first object to a scratch object list responsive, designating the first object as a scratch object, and removing the first object from the list of objects;
   determining whether each object remaining in the list of objects meets scratch object parameters and is within a predetermined distance of the first object; and
   if so, then adding each such object to the scratch object list and designating each such object part of the scratch object.

32. The method of claim 31, wherein detecting a scratch object further comprises:
   removing each object added to the scratch object list from the list of objects.

33. The method of claim 32, wherein detecting a scratch object further comprises:
   deleting each scratch object having less than a minimum number of objects.

34. A system for detecting spatial failures in a wafer, the system comprising:
   a central processing unit including:
   means for receiving failure coordinates for the wafer, each failure coordinate indicating a spatial failure;
   means for generating a failure array based on a resolution of the failure coordinates;
   means for detecting a first set of objects in the failure array using transformations;
   means for detecting a second set of objects in the failure array using cluster signature analysis; and
   means for detecting a third set of objects in the failure array, the third set of objects being combinations of at least two objects in the first and second sets of objects.

* * * * *

UNITED STATES PATENT AND TRADEMARK OFFICE
CERTIFICATE OF CORRECTION

PATENT NO. : 7,602,964 B2  
APPLICATION NO. : 11/329587  
DATED : October 13, 2009  
INVENTOR(S) : Rafik Marutyan Page 1 of 1

It is certified that error appears in the above-identified patent and that said Letters Patent is hereby corrected as shown below:

Column 13, line 56, amend "averages" to -- average --.

Column 14, line 29, amend "objects" to -- object --.

Signed and Sealed this

Fifteenth Day of December, 2009

David J. Kappos  
*Director of the United States Patent and Trademark Office*